United States Patent [19]

Bordini et al.

[11] 4,211,811

[45] Jul. 8, 1980

[54] LAMINATED OLEFINIC POLYMER SHEETS FOR PACKAGING

[75] Inventors: Fosco Bordini; Luigi Mauri, both of Terni, Italy

[73] Assignee: Moplefan S.p.A., Milan, Italy

[21] Appl. No.: 861,945

[22] Filed: Dec. 19, 1977

[30] Foreign Application Priority Data

Dec. 20, 1976 [IT] Italy ................. 30637 A/76

[51] Int. Cl.$^2$ ............................................. B32B 27/06
[52] U.S. Cl. ..................................... 428/220; 428/414; 428/424.8; 428/474; 428/461; 428/910; 428/516; 428/517; 428/518; 428/519; 428/520; 156/334; 428/425.8
[58] Field of Search .............. 428/212, 220, 414, 424, 428/474, 461, 516–520, 910

[56] References Cited

U.S. PATENT DOCUMENTS

| | | | |
|---|---|---|---|
| 3,496,061 | 2/1970 | Freshour et al. | 428/516 X |
| 3,660,150 | 5/1972 | Cooper | 428/516 |
| 3,671,383 | 6/1972 | Sakata et al. | 428/516 X |
| 3,973,063 | 8/1976 | Clayton | 428/35 |
| 3,998,602 | 12/1976 | Horowitz et al. | 428/461 X |

*Primary Examiner*—P. C. Ives

*Attorney, Agent, or Firm*—Stevens, Davis, Miller & Mosher

[57] ABSTRACT

There is disclosed a bonded sheet for packaging, having a thickness ranging from 20 to 200 microns, a low transmittance, a low permeability to gases and vapors, a high resistance to perforation, and high anti-static characteristics, said bonded sheet consisting essentially of two films prepared from substantially crystalline polyolefin polymers or mixtures thereof and, optionally, from an interposed adhesive layer, wherein at least one of the two films is a film oriented by the stretching of polypropylene essentially constituted by isotactic macromolecules and having a melt index between 0.5 and 5, and wherein at least one of the two films is coated, on the surface thereof which is in contact with the other film, with a metallized layer (preferably aluminum) having a resistivity between 1 and 5 Ohms. One of the two films may be a film, optionally oriented by stretching, prepared from a polymer selected from the class consisting of a polyethylene having a melt index of from 0.5 to 15, a polypropylene having a melt index of from 5 to 20, a crystalline propylene-ethylene copolymer containing from 0.1 to 15% by weight of ethylene and having a melt index of from 3 to 20, and mixtures thereof.

8 Claims, No Drawings

LAMINATED OLEFINIC POLYMER SHEETS FOR PACKAGING

This invention relates to bonded or laminated sheets based on films made from olefinic polymers that exhibit improved characteristics in the manufacture of containers, envelopes, bags, cans and manufactured articles in general that are principal intended for use in the packing industry.

As is well known, materials meant for packing or packaging uses must possess a complex of mechanical and aesthetic properties, as well as characteristics of impermeability, thermoweldability, and still other characteristics that are seldom present simultaneously in the films made from one type only of polymer. For this reason use is often made of bonded sheets obtained by bonding two or more films of different substances.

Bonded sheets and laminates prepared from polyolefin films with films made from other thermoplastic polymers or metal sheets, such as aluminum sheets, and described in earlier patents and patent applications owned by the assignee hereof, are already known.

Bonded sheets prepared from oriented polypropylene films obtained by filming mixtures of polypropylene with polyethylene or ethylene-propylene crystalline copolymers are known too.

It has now been found, and this is the object of the present invention, that it is possible to obtain bonded sheets characterized by a low permeability to the diffusion of gases and vapors, by high anti-static properties, besides high values of thermoweldability, of resistance of the weld and to perforation, along with excellent mechanical and aesthetic properties, by bonding, with or without any interposed adhesives, two films made from substantially crystalline polyolefin polymers or from mixtures there of, of which at least the first film, (A), is a film oriented by the stretching of polypropylene consisting essentially of isotactic macromolecules, having a melt index ranging from 0.5 to 5, and the second film (B), is a film, optionally oriented by stretching, prepared from polyethylene, isotactic polypropylene, propylene-ethylene crystalline copolymers containing predominantly propylene of both the block and the random type, mixtures of polyethylene with polypropylene, or with propylene-ethylene copolymers, and mixtures of polypropylene with propylene-ethylene copolymers, and in which one of the two films is provided, on its surface in contact with the other film, with a metallized coating having a resistivity between 1 and 5 Ohms.

In the event that oriented films are employed, it is advisable to coat one of the two films with a thermoweding layer.

Metallization is carried out under vacuum using metals such as aluminum, zinc, gold, palladium, cadmium, preferably on films optionally previously subjected to a treatment with continuous, not-perforating electric discharges. Metallization with aluminum is the most economical and best suited to packings.

The electric discharge treatment of the film is carried out in conventional manner by subjecting it to a non-disrupting electric or corona discharge, using a device which is connected to an alternating voltage source having a magnitude of 200–500 volts and a frequency of 50–60 HZ. Such a device produces in a discharging space where the film is passed between an output electrode and a heated roller (driving the film) a voltage of 3,000–10,000 volts at a frequency of 8,000–16,000 HZ. Devices of this type are manufactured by the well known Italian company S.C.A.E.

Each film forming the bonded sheets according to this invention has a thickness preferably ranging from 10 to 100 microns.

The polypropylene of film (B) has a melt index preferably between 5 and 20, the polyethylene between 0.5 and 15, and the propylene-ethylene copolymers between 3 and 20.

The ethylene content of the copolymers is preferably between 0.1 and 15%.

In the mixtures, the polyethylene or propylene-ethylene copolymers are employed at the rate of 1-50% by weight based on the total.

The bonded sheets are generally prepared by lamination of the two films with each other, either with or without interposed adhesives, by causing them to pass between rollers heated to 30°-90° C.

Both the bonding of the two films (A) and (B) without interposing adhesives, and the coating of one of the films with a thermowelding layer, that may consist also of polyethylene, of propylene-ethylene crystalline copolymers, and of mixtures of polyethylene and propylene-ethylene copolymers, can be carried out also according to the so-called extrusion coating method.

When adhesives are utilized, they are applied to one film face, according to known methods, in particular by spreading, starting from solutions or dispersions thereof in water or organic solvents.

Generally, solutions having an adhesive concentration between 5 and 40% by weight are employed, in order to provide an amount of adhesive on the film ranging from 1 to 10 g/m² of surface.

The adhesives which have proved particularly suited are synthetic adhesives consisting or consisting essentially of thermoplastic resins, such as cellulose esters and ethers, alkyl and acrylic esters, polyamides, polyurethanes, polyesters; or thermosetting resins, such as epoxy resins, urea/formaldehyde, phenol/formaldehyde, melamine/formaldehyde resins; or synthetic rubbers.

As solvents for the adhesive use is made in particular of hydrocarbons, such as ligroin and toluene; or esters, such as ethyl acetate; or ketones, such as acetone and methyl-ethyl-ketone.

The polyolefin films to be bonded or laminated according to the present invention are prepared from olefinic polymers to which—prior to filming—conventional additives may be added, such as, for example, opacifiers, stabilizers, lubricants, fillers, and/or organic and inorganic pigments.

The polyolefin films to be bonded may be optionally subjected to a superficial pretreatment with continuous, not-perforating electric discharges, or with chemical agents, in order to increase their adhesive receptivity, and optionally may be lacquered according to conventional methods in order to improve their thermoweldability characteristics.

The films prepared from propylene polymers having a melt index of from 0.5 to 5 are oriented by stretching in one or two directions according to known methods.

The bonded or laminated sheets according to this invention are useful in the field of foodstuff packaging, including the packaging of products under vacuum.

The transmittance measurements are made by spectrophotometry

The permeability to water vapor is evaluated according to standard ASTM-E-96, and the permeability to other gases according to standard ASTM-D-1434, both at 25° C.

The melt index is determined according to standard ASTM-D-1238-65T.

The resistance to welding of the bonded sheets is measured according to the peeling strength test method, evaluating the tensile strength of the weld by means of a dynamometer (for example an Instron dynamometer).

The resistance to perforation of the bonded sheets is measured by means of a dynamometer of the Instron type, using a punch having a diameter of 1.4 mm and a union of 0.7 mm.

Many variations and changes may be made in the details of the present invention when embodying it, but without departing however from the spirit and the objects thereof. The following examples are therefore given to illustrate this invention without being however a limitation thereof.

EXAMPLE 1

A bonded sheet was prepared by conveying between rollers heated to 70° C.:

(A) a polypropylene film biaxially-oriented by stretching in the longitudinal and transversal directions, subjected to a treatment with continuous, non-perforating electric discharges, and metallized under vacuum on one face with aluminum (surface resistivity =3 Ohms), and having the following characteristics:
  thickness: 25 microns
  longitudinal tensile strength: 13 kg/mm$^2$
  transversal tensile strength: 28 kg/mm$^2$
  longitudinal elongation: 180%
  transversal elongation: 45%
  resistance to tearing (Elmendorf): 11 g/25 microns.

The polypropylene employed for filming was a polymer having prevailingly isotactic macromolecules, prepared in the known way by means of stereospecific catalysts, having a melt index equal to 4, a residue to the extraction with heptane of 96.5%, and an ash content of 75 ppm. The metallized face of the film was coated with an adhesive based on polyurethane in an amount of 1.5 g/m$^2$ of surface;

(B) an unoriented film, having a 25-micron thickness, treated with continuous, non-perforating electrical discharges, and prepared by the filming of polypropylene having a melt index equal to 10, a residue to the extraction with heptane of 96.5%, and an ash content of 75 ppm.

The resulting bonded sheet exhibited the following characteristics:
  thickness: 52 microns
  transmittance: 1%
  permeability:
    to oxygen: 35 cm$^3$/m$^2$.24 h.kg/cm$^2$
    to carbon dioxide: 150 cm$^3$/m$^2$.24 h.kg/cm$^2$
    to water vapor: 1 g/m$^2$.24 h
  weldability range: 150°–170° C.
  resistance of the weld: 700 g/cm
  resistance to perforation: 1300 g

EXAMPLE 2

A bonded sheet was prepared by following exactly the procedure of Example 1, except that film (B) was replaced by an unoriented, 25-micron thick film, subjected, prior to bonding, to a treatment with continuous, non-perforating electric discharges, and prepared by the filming of a block crystalline propylene-ethylene copolymer having an ethylene content equal to 2.5% and a melt index of 12.

The bonded sheet thus obtained exhibited the following characteristics:
  thickness: 52 microns
  transmittance: 1%
  permeability:
    to oxygen: 30 cm$^3$/m$^2$.24 h.kg/cm$^2$
    to carbon dioxide: 140 cm$^3$/m$^2$.24 h/kg/cm$^2$
    to water vapor: 1.5 g/m$^2$.24 h
  weldability range: 135°–155° C.
  resistance of the weld: 650 g/cm
  resistance to perforation: 1300 g

EXAMPLE 3

A bonded sheet was prepared by repeating exactly Example 1, except that film (B) was substituted by an unoriented, 25-micron thick film, subject—prior to bonding—to a treatment with continuous, non-perforating electric discharges, and prepared by the filming of a mixture containing 90% by weight of polypropylene having a melt index of 10, a residue to the extraction with heptane of 96.5%, and an ash content of 75 ppm, and 10% by weight of low-density polyethylene.

The resulting bonded sheet exhibited the following characteristics:
  thickness: 52 microns
  transmittance: 1%
  permeability:
    to oxygen: 35 cm$^3$/m$^2$.24 h.kg/cm$^2$
    to carbon dioxide: 140 cm$^3$/m$^2$.24 h.kg/cm$^2$
    to water vapor: 1.5 g/m$^2$.24 h
  weldability range: 135°–155° C.
  resistance of the weld: 600 g/cm
  resistance to perforation: 1300 g

EXAMPLE 4

A bonded sheet was prepared exactly according to the procedure of Example 1, with the exception that film (B) was substituted by an unoriented, 25-micron thick film subjected, prior to bonding, to a treatment with continuous, non-perforating electric discharges, and prepared by filming a mixture containing 5% by weight of polyethylene having a melt index of 2, and 95% by weight of a random crystalline propylene-ethylene copolymer having 2% of ethylene and a melt index equal to 10.

The bonded sheet thus obtained exhibited the following characteristics:
  thickness: 52 microns
  transmittance: 1%
  permeability:
    to oxygen: 40 cm$^3$/m$^2$.24 h. kg/cm$^2$
    to carbon dioxide: 140 cm$^3$/m$^2$.24 h.kg/cm$^2$
    to water vapor: 2 g/m$^2$.24 h
  weldability range: 130°–150° C.
  resistance of the weld: 600 g/cm
  resistance to perforation: 1200 g

EXAMPLE 5

A bonded sheet was prepared by exactly repeating Example 1, with exception that the bonding rollers were heated to 30° C. instead of to 70° C. and that film (B) was replaced by an unoriented, 25-micron thick film, subjected, prior to bonding, to a treatment with continuous, non-perforating electric discharges, and prepared by filming a low-density polyethylene having a melt index equal to 2.

The resulting bonded sheet had the following characteristics:
thickness: 52 microns
transmittance: 1%
permeability:
  to oxygen: 50 cm$^3$/m$^2$.24 h.kg/cm$^2$
  to carbon dioxide: 150 cm$^3$/m$^2$.24 h.kg/cm$^2$
  to water vapor: 2 g/m$^2$.24 h
weldability range: 115°–125° C.
resistance of the weld: 600 g/cm
resistance to perforation: 1200 g

EXAMPLE 6

A bonded sheet was prepared by repeating exactly Example 1, with the exception that film (B) was replaced by a polypropylene film, biaxially-oriented by stretching in two directions, longitudinal and transversal, having a 25-micron thickness, and prepared by the filming of polypropylene having a melt index of 4, coated with a welding layer applied without any primer, according to the extrusion coating method. The welding layer consisted of a random crystalline propylene-ethylene copolymer containing 5% of ethylene, having a melt index of 10. Prior to bonding, film (B) was subjected to a treatment with continuous, non-perforating electrical discharges.

The bonded sheet so obtained exhibited the following characteristics:
thickness: 52 microns
transmittance: 1%
permeability:
  to oxygen: 20 cm$^3$/m$^2$.24 h.kg/cm$^2$
  to carbon dioxide: 130 cm$^3$/m$^2$.24 h.kg/cm$^2$
  to water vapor: 1 g/m$^2$.24 h
weldability range: 135°–155° C.
resistance of the weld: 400 g/cm
resistance to perforation: 1500 g

EXAMPLE 7

A bonded sheet was prepared by exactly following the procedure of Example 6, except that the welding layer coating film (B) was replaced by a mixture containing 95% by weight of polypropylene having a melt index equal to 12, a residue to the extraction with heptane of 96.5%, and an ash content of 75 ppm, and 5% by weight of low-density polyethylene.

The resulting bonded sheet exhibited the following characteristics:
thickness: 52 microns
transmittance: 1%
permeability:
  to oxygen: 25 cm$^3$/m$^2$.24 h.kg/cm$^2$
  to carbon dioxide: 130 cm$^3$/m$^2$.24 h.kg/cm$^2$
  to water vapor: 1 g/m$^2$.24 h
weldability range: 135°–155° C.
resistance of the weld: 400 g/cm
resistance to perforation: 1500 g

EXAMPLE 8

A bonded sheet was prepared by exactly repeating Example 6, with the exception that the welding layer coating film (B) was substituted by a mixture containing 5% by weight of low-density polyethylene having a melt index=5, and 95% by weight of a random crystalline propylene-ethylene copolymer having 2% of ethylene and a melt index of 10.

The resulting bonded sheet exhibited the following characteristics:
thickness: 52 microns
transmittance: 1%
permeability:
  to oxygen: 30 cm$^3$/m$^2$.24 h.kg/cm$^2$
  to carbon dioxide: 140 cm$^3$/m$^2$.24 h.kg/cm$^2$
  to water vapor: 1 g/m$^2$.24 h
weldability range: 130°–150° C.
resistance of the weld: 450 g/cm
resistance to perforation: 1400 g

EXAMPLE 9

A bonded sheet was prepared by exactly repeating Example 1, with the exception that film (B) was substituted by a film oriented by stretching in the two directions, longitudinal and transversal, having a 25-micron thickness, and prepared by the filming of polypropylene having a melt index=3, a residue to the extraction with heptane of 96%, an ash content of 80 ppm, subjected to treatment with continuous, non-perforating electric discharges, a face of such film being coated with a vinyl lacquer made from a solution of a vinyl chloride/vinyl acetate (87/13) copolymer in methyl-ethyl-ketone, after coating with polyethylene imine.

The resulting bonded sheet exhibited the following characteristics:
thickness: 54 microns
transmittance: 1%
permeability:
  to oxygen: 25 cm$^3$/m$^2$.24 h.kg/cm$^2$
  to carbon dioxide: 130 cm$^3$/m$^2$.24 h.kg/cm$^2$
  to water vapor: 1.5 g/m$^2$.24 h
weldability range: 120°–140° C.
resistance of the weld: 450 g/cm
resistance to perforation: 1500 g

EXAMPLE 10

A bonded sheet was prepared by conveying between rollers heated to 90° C:

(A) a polypropylene film bioxially-oriented by stretching in the longitudinal and transversal directions, subjected—prior to bonding—to continuous, now-perforating electric discharges, metallized under vacuum with aluminum (surface resistivity=3 Ohms), and exhibiting the following characteristics:
thickness: 25 microns
longitudinal tensile strength: 13 kg/mm$^2$
transversal tensile strength: 28 kg/mm$^2$
longitudinal elongation: 180%
transversal elongation: 45%
resistance to tearing (Elmendorf) 11 g/25 microns The polypropylene employed for the filming was a polymer having prevailingly isotactic macromolecules, prepared in the known way by means of stereospecific catalysts, having a melt index of 4, a residue to the extraction with heptane equal to 96.5%, and an ash content of 75 ppm. The film was coated, on its metallized face, with a polyurethane-based adhesive in an amount of 1.5 g/m$^2$ of surface; and (B) a 30-micron thick unoriented film, prepared by filming a mixture containing 90% by weight of polypropylene having a melt index of 10, a residue to the extraction with heptane of 96.5%, an ash content of 75 ppm, and 10% by weight of low-density polyethylene.

The resulting bonded sheet exhibited the following characteristics:
thickness: 55 microns
transmittance: 1%
permeability:
  to oxygen: 35 cm$^3$/m$^2$.24 h.kg/cm$^2$
  to carbon dioxide: 140 cm$^3$/m$^2$.24 h.kg/cm$^2$ to water vapor: 1.5 g/m² .24 h
weldability range: 135°–155° C.
resistance of the weld: 600 g/cm
resistance to perforation: 1300 g

EXAMPLE 11

By passage between rollers heated to 70° C., a bonded sheet was prepared from:

(A) a polypropylene film bioxially-oriented by stretching the two directions longitudinal and transversal, that was subjected prior to bonding, to a treatment with continuous, non-perforating electric discharges, and exhibiting the following characteristics:
 thickness: 25 microns
 longitudinal tensile strength: 13 kg/mm²
 transversal tensile strength: 28 kg/mm²
 longitudinal elongation: 180%
 transversal elongation: 45%
 resistance to tearing (Elmendorf): 11 g/25 microns.

The polypropylene utilized for the filming was a polymer having predominantly isotactic macromolecules, prepared in the known way by means of stereospecific catalysts, having a melt index=4, a residue to the extraction with heptane=96.5%, and an ash content=75 ppm.

A face of the film was coated with an amount of a polyurethane-based adhesive equal to 1.5 g/m² of surface; and (B) a polypropylene film bioxially-oriented by stretching in the longitudinal and transversal directions, having a 25-micron thickness, prepared from polypropylene having a melt index=4, having one of its faces coated with a welding layer (2-micron thick) applied without any primer, according to the co-extrusion method. The welding layer consisted of a block crystalline propylene-ethylene copolymer containing 5% of ethylene, melt index=10. Prior to bonding, the other face of film B) was subjected to a treatment with continuous, non-perforating electric discharges and to a successive metallization under vacuum with aluminum (surface resistivity=3 Ohms).

The resulting bonded sheet exhibited the following characteristics:
 thickness: 54 microns
 transmittance: 1%
 permeability:
  to oxygen: 20 cm³/m².24 h.kg/cm²
  to carbon dioxide: 130 cm³/m².24 h.kg/cm²
  to water vapor: 1 g/m².24 h
 weldability range: 135°–155° C.
 resistance of the weld: 400 g/cm
 resistance to perforation: 1500 g

EXAMPLE 12

A bonded sheet was prepared by exactly following Example 11, except that the welding layer of film (B) was substituted by a mixture of 95% by weight of polypropylene having a melt index=12, a residue to the extraction with heptane=96%, and an ash content=80 ppm, with 5% by weight of low-density polyethylene.

The bonded sheet so obtained exhibited the following characteristics:
 thickness: 54 microns
 transmittance: 1%
 permeability:
  to oxygen: 25 cm³/m².24 h.kg/cm²
  to carbon dioxide: 130 cm³/m².24 h.kg/cm²
  to water vapor: 1 g/m².24 h
 weldability range: 135°–155° C.
 resistance of the weld: 400 g/cm
 resistance to perforation: 1500 g

EXAMPLE 13

A bonded sheet was prepared by repeating exactly Example 11, with the exception that the welding layer of film (B) was substituted by a mixture consisting of 5% by weight of polyethylene having a melt index=5, and 95% by weight of a random crystalline propylene-ethylene copolymer having 2% of ethylene, melt index=10.

The resulting bonded sheet exhibited the following characteristics:
 thickness: 54 microns
 transmittance: 1%
 permeability:
  to oxygen: 30 cm³/m².24 h.kg/cm²
  to carbon dioxide: 140 cm³/m².24 h.kg/cm²
  to water vapor: 1 g/m².24 h
 weldability range: 130°–150° C.
 resistance of the weld: 450 g/cm
 resistance to perforation: 1400 g

EXAMPLE 14

A bonded sheet was prepared by exactly repeating Example 11, with the exception that film (B) was substituted by a film oriented by stretching in the longitudinal and transversal directions, having a 25-micron thickness, prepared by the filming of polypropylene having a melt index=3, a residue to the extraction with heptane=96%, and an ash content=80 ppm, subjected to a treatment with continuous, non-perforating electric discharges; a face of such film being coated with a vinyl lacquer made up of a solution of vinyl chloride/vinyl acetate (87/13) copolymer in methyl-ethyl-ketone, after coating with polyethylene imine, while the other face was coated, through metallization under vacuum, with an aluminum layer having a surface resistivity of 3 Ohms.

The resulting bonded sheet exhibited the following characteristics:
 thickness: 54 microns
 transmittance: 1%
 permeability:
  to oxygen: 25 cm³/m².24 h.kg/cm²
  to carbon dioxide: 130 cm³/m².24 h.kg/cm²
  to water vapor: 1.5 g/m².24 h
 weldability range: 120°–140° C.
 resistance of the weld: 450 g/cm
 resistance to perforation: 1500 g

What is claimed is:

1. A bonded sheet for packaging, having a thickness ranging from 20 to 200 microns and consisting essentially of two films, a first film and a second film, prepared from substantially crystalline polyolefin polymers, or mixtures thereof, wherein at least the first film of the two films is a film oriented by the stretching of polypropylene essentially constituted by isotactic macromolecules and having a melt index between 0.5 and 5, and wherein at least one of the two films is coated, on the surface thereof which is in contact with the other film, with a metallized layer having a resistivity between 1 and 5 Ohms.

2. A bonded sheet according to claim 1, wherein the second film of the two films is prepared from a polymer selected from the class consisting of a polypropylene having a melt index of from 0.5 to 15, a polypropylene having a melt index of from 5 to 20, a crystalline propylene-ethylene copolymer containing from 0.1 to 15% by weight of ethylene and having a melt index of from 3 to 20, and mixtures thereof.

3. A bonded sheet according to claim 1, wherein the metallized layer consists essentially of aluminum.

4. A bonded sheet according to claim 1, wherein at least one of the two films is coated with a thermowelding layer.

5. A bonded sheet according to claim 1, wherein an adhesive layer is interposed between the two films.

6. A bonded sheet according to claim 2, wherein the second film is oriented by stretching.

7. A bonded sheet according to claim 5, wherein the second film of the two films is prepared from a polymer selected from the class consisting of a polyethylene having a melt index of from 0.5 to 15, a polypropylene having a melt index of from 5 to 20, a crystalline propylene-ethylene copolymer containing from 0.1 to 15% by weight of ethylene and having a melt index of from 3 to 20, and mixtures thereof.

8. A bonded sheet according to claim 7, wherein the second film is oriented by stretching.

* * * * *